United States Patent [19]

Wollar et al.

[11] 4,393,551
[45] Jul. 19, 1983

[54] ROTATABLY ENGAGING HEAD FOR FASTENER

[75] Inventors: Burnell J. Wollar, Barrington, Ill.; Richard J. Schwind, Akron, Ohio

[73] Assignee: Phillips Plastics Corp., Phillips, Wis.

[21] Appl. No.: 181,139

[22] Filed: Aug. 25, 1980

[51] Int. Cl.³ .............................................. A44B 17/00
[52] U.S. Cl. .................................. 24/213 R; 411/509; 24/221 R
[58] Field of Search ............. 24/221 R, 221 K, 213 R, 24/214, 305, 326, 350, 351, 221 A; 411/500, 508, 509, 510

[56] References Cited

U.S. PATENT DOCUMENTS

| 3,225,641 | 12/1965 | Harris et al. | 411/510 |
| 3,309,955 | 3/1967 | Turnbull et al. | 411/509 |
| 4,214,505 | 7/1980 | Almar | 24/350 |
| 4,270,328 | 6/1981 | Page et al. | 24/213 R |

Primary Examiner—Robert A. Hafer
Attorney, Agent, or Firm—James E. Nilles

[57] ABSTRACT

A rotatably engaging head for a fastener for attaching a complementary panel member to a support member. The head includes a substantially flat underside and also includes a generally radially extending slit. One edge of the slit is connected to and defined by a lead-in tongue spaced above and generally parallel to the head. The tongue permits facile introduction of the head through an aperture in the panel, which aperture is smaller than the head. Extending from the head is a shank, for engagement of the support member to the panel member.

5 Claims, 11 Drawing Figures

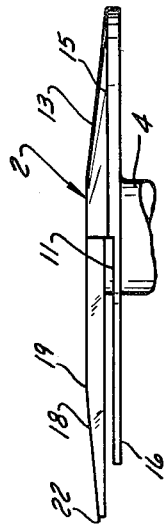
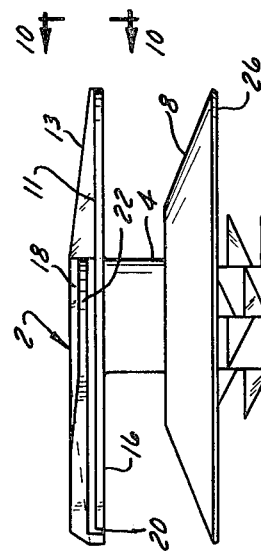
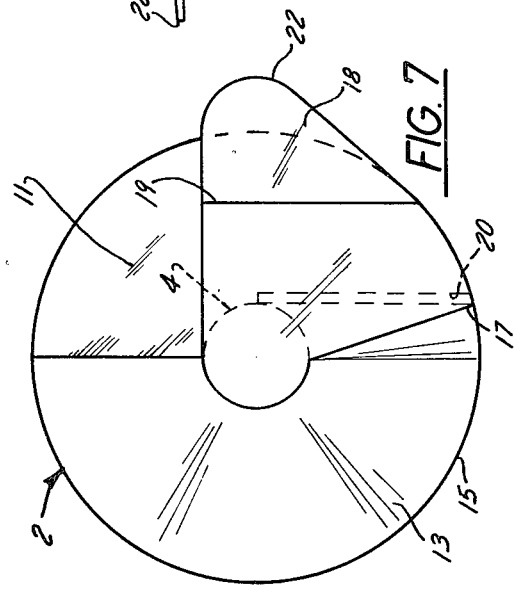
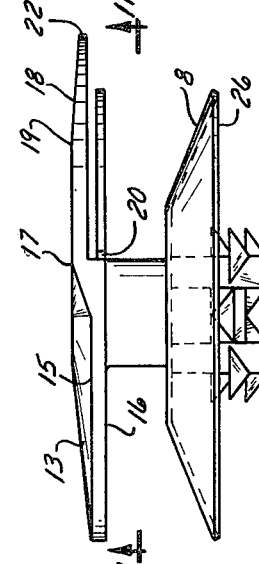
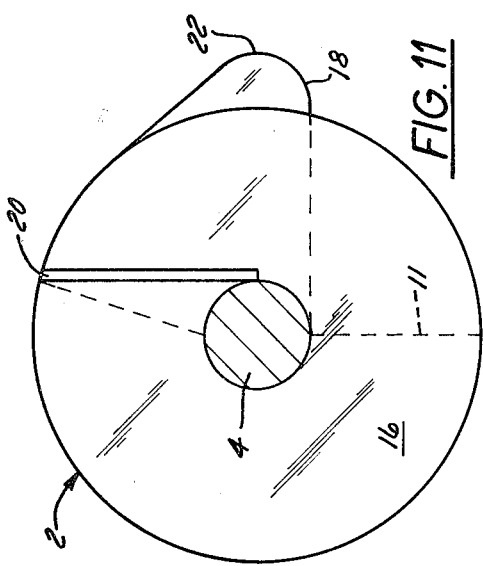
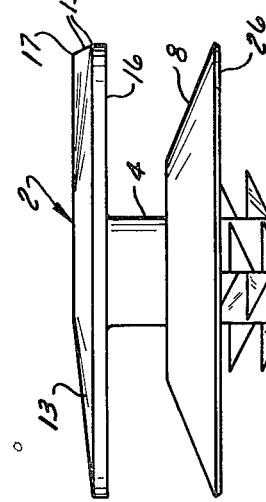

ROTATABLY ENGAGING HEAD FOR FASTENER

BACKGROUND OF THE INVENTION

1. Field of Use

This invention relates generally to fasteners for attaching apertured panels. In particular, it relates to fasteners with heads that are rotatably engageable into one of the apertured panels, the heads formed so as to provide maximum support to the panel and so as to prevent inadvertent removal of the head from that panel.

2. Description of Prior Art

Several fasteners with heads substantially larger than the apertures through which the heads are inserted are currently in use. Most have lead-in tongues which are inserted through a hole in a panel member, and a twisting motion imparted to the fastener's shank properly positions the head in its panel. The opposite or shank end of the fastener is then ready for insertion, as by pushing, through the aperture of a support member. Typically, these fasteners have a head in the form of a flange of which the edge is recessed radially inwards on one side, and the head is inserted at one of the two corners at the recess, as shown in U.S. Pat. No. 3,309,955, issued to Turnbull et al on Mar. 21, 1967, hereinafter referred to as Turnbull. FIG. 5 in that patent shows the head being inserted at one of the two corners of the recess, which is generally approximately V-shaped and can be as small as a straight or curved, substantially radial cut through the flange, as shown in U.S. Pat. No. 3,225,641, issue to Harris et al on Dec. 28, 1965, or as large as 140°, as illustrated by the 90° V-notch shown in FIG. 2 of Turnbull.

These current heads have some significant disadvantages. A large V-notch in such a head provides the fastener with less support when the head is in place in the panel member. The head, and thus the fastener, may tip or cant or have one of the two recess corners drop back into the panel member's aperture, and the head may then fall out of that aperture rendering the fastener useless. Even if the V-notch is reduced in size to 0 degrees by the use of a mere slit in the head, the head may still become disengaged from the panel in the manner described above if the panel is made of a resilient material.

SUMMARY OF THE INVENTION

The invention provides a resilient fastener for attaching an apertured complementary panel member to an apertured support member and includes a head of diameter larger than the panel member's aperture, said head having an upperside, an underside and a slit extending radially inwardly from the circumferential edge of the head a shank extending from the underside of the head, and a lead-in tongue connected to the head adjacent said slit and spaced above and generally parallel to the upperside of the head such tongue covering the entire slit and a portion of the head. The slit permits the introduction of the head into the panel aperture whereby the fastener may be rotated therethrough.

The present fastener offers several advantages over prior art fasteners, for example, because it is resilient and has a lead-in tongue overlapping the slit, that slit is practically closed off when the fastener is in place, thereby substantially reducing inadvertent twisting and loosening of the fastener in the panel member. As there is no open V-shaped notch in the head, the fastener in the panel cannot tip or cant along the notch, which would cause misalignment of the apertures in the panel and support members. The present fastener resists shear forces on the panel or support members, because the notchless head will not shift from a position normal with the panel member.

Other aspects of the invention relate to a fastener with a head providing a full 360 degrees of support and preventing the inadvertent disengagement of the fastener while in place in a panel member, one that is easily threaded into an aperture that is larger than that head, a head construction that will inhibit the tendency for the fastener to tip or cant while in place in a panel member, and a fastener which tends to resist shear forces on the panel member and support member connected thereby. Other objects and advantages of the invention will hereinafter appear.

BRIEF DESCRIPTION OF THE DRAWINGS

FIG. 6 is a view similar to FIG. 2, but without the panel member;

FIG. 7 is a top view of the fastener head of FIG. 6;

FIG. 8 is a left side elevational view of the fastener of FIG. 6;

FIG. 9 is a right side elevational view of the fastener shown in FIG. 6;

FIG. 10 is a side elevational view of the fastener, taken along line 10—10 of FIG. 9.

FIG. 11 is a cross-sectional view of the underside of the head of the fastener taken along line 11—11 of FIG. 6.

DESCRIPTION OF A PREFERRED EMBODIMENT

Figure 1:
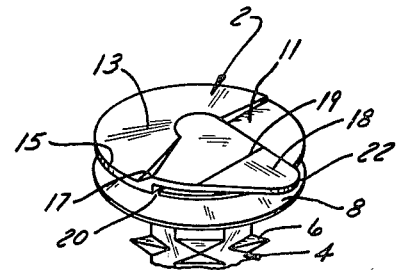
FIG. 1 is a fragmentary perspective view of an embodiment of the present fastener, fully showing the head and partially showing the shank and projections thereon.
Figure 2:
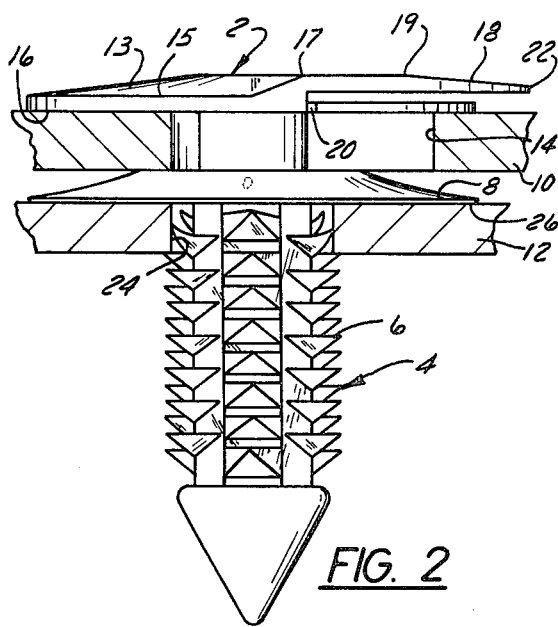
FIG. 2 is a side elevational view on an enlarged scale of the fastener shown in FIG. 1, and showing the fastener in a panel member and a support member.

The resilient fastener, with the novel head and a portion of a typical shank, is shown in perspective in FIG. 1. Such a fastener may be constructed by inexpensive methods, such as plastic molding. The fastener is comprised of a head 2, a shank 4, a plurality of flexible projections 6, and a continuous, resilient conical flange 8 spaced from the head 2 along the shank 4. The fastener when in place secures an apertured panel member 10 to apertured support member 12 (FIG. 2). The head 2 of the fastener is rotated through the panel member aperture 14, although that aperture 14 is smaller in diameter than the head 2. In the fastener shown in this embodiment, the location of the projections 6 on the shaft 4 enable the fastener to be used with support panels of various thicknesses.

Figure 3:
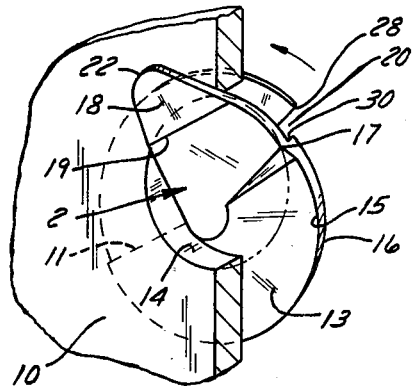
FIG. 3 is a fragmentary perspective view showing the head of the fastener being inserted through an aperture in a panel member.
Figure 5:
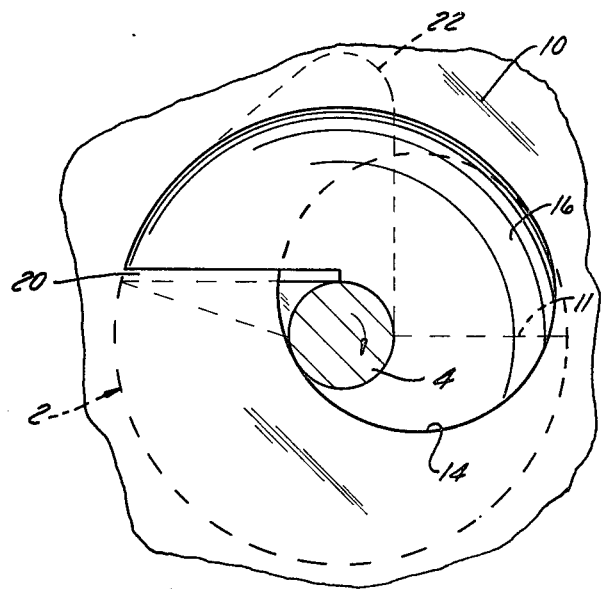
FIG. 5 is a cross-sectional view taken along line 5—5 of FIG. 4 showing the head auguring into the aperture.
Figure 4:
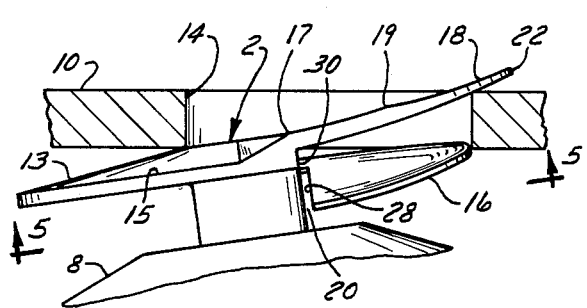
FIG. 4 is a fragmentary sectional view showing the head of the fastener being inserted through an aperture in a panel member.

The head has an upperside, a substantially flat, circular underside 16 of 360 degrees and a circumferential edge from which a slit 20 extends radially inwardly. A lead-in tongue 18 is spaced above and generally parallel to the upperside and the underside 16 of the head 2, and is connected with the upperside of the head 2 along one edge of the generally radially extending slit 20. The tongue 18 circumferentially overlaps or covers the slit 22 over its entire length and also overlaps a portion of the upperside of head 2. The tongue 18 is tapered, having its thickest portion directly above slot 20 and tapering from approximately its midpoint 19 to its tip 22, the tip 22 being that portion which, as shown in FIGS. 2, 3, and 7, extends beyond the radial extent of the underside 16 of the head 2. The portion of the tongue between the leading edge 17 of camming edge 15 and the midpoint 19 is of substantially uniform thickness and need not be cammed. This tip 22 at the radial outer end of tongue 18 provides a guiding surface for the entry of the head 2 through the panel member aperture 14, and the taper gives the tongue 18 flexibility so that the tip 22 may more easily enter that aperture 14. By inserting the tip 22 into the panel member aperture 15 (FIGS. 3 and 4), and by then gripping and rotating the fastener at the shank 4 in the direction indicated in FIGS. 3 and 5, the head 2 moves through the smaller panel member aperture 14 from a position on one side of the panel member 10, as shown in FIG. 4, to a position on the other side of the panel member 10, as shown in FIG. 2.

The bifurcated quadrant of the fastener is that portion where the tongue 18 overlaps the underside 16 of the head 2. A relieved area 11 on the head, in combination with the bifurcated quadrant, facilitates insertion of the fastener head into the panel member aperture 14, as shown in FIGS. 3 and 4. The conical portion 13 of head 2 and the camming edge 15, working on the side of the panel member aperture 14 nearest support member 12 (see FIG. 4), act to keep the bifurcated portion on an angle. The camming edge 15, in combination with the conical portion 13 of head 2 which acts as a camming surface, provides the guiding means for the head 2 to move through panel member aperture 14 in a helical path.

After the head 2 has passed through the panel member aperture 14, the panel member 10 and fastener attached thereto are in position to engage the support member 12 through support member aperture 24. This is done by merely pushing the shank 4 of the fastener into that aperture 24. The projections are tightly engaged in support member aperture 24, precluding lateral movement of the shank 4 within aperture 24. The projections 6 touching the face of the support panel 12 farthest from the flange 8 ensure that the fastener retains its grip on the panel 12. In attaching the panel member to the support member, their respective apertures may not be precisely aligned. To permit assembly of a panel and support member with such misalignment, the upper portion of shank 4, that is, that portion nearest the head 2, is of a diameter smaller than that of panel member aperture 14, as shown in FIG. 2. The axial position of panel member aperture 14 with respect to the axial position of support member aperture 24 may then, as can be seen in FIG. 2, vary significantly. The panel member 10 in FIG. 2 could have been shifted somewhat to the right or substantially to the left with respect to the support member 12 and the shank 4 would still have been within the panel member aperture 14 and the head underside 16 would still have completely covered panel member aperture 14.

As stated above, a continuous, resilient conical flange 8 is spaced from the head 2 along the shank 4. The flange 8 is generally parallel to the head 2, and when the fastener has been snapped into the support panel aperture 24, the flange 8 is between the two panels 10 and 12 and tapered towards the suppot panel 12 as seen in FIG. 2. With the fastener thereby snapped into place, the flange 8 flexes so that its edge 26 presses firmly against the support panel 12, forming a tight, resilient seal against support panel aperture 24.

Thus, with the fastener in place, attaching the panel 10 and support 12 members as seen in FIG. 2, only the underside 16 of head 2 contacts panel member 10. The underside 16 being a full 360 degrees, the fastener is better able to resist shear and other forces which could cause fasteners having a V-notch to tip or cant. With the tongue 18 positioned directly above the underside 16, and the slit 20 essentially covered by the tongue 18, the possibility of a resilient panel material becoming inadvertently disengaged from the fastener's head 2 by passing backwards through the slit 20 is minimized. This occurs because when the fastener is not engaging panels, the underside edge 28 of the slit is normally lower than the tongue edge 30 of the slit, as is shown in exaggerated scale in FIG. 4. When the fastener is engaging panels, as shown in FIG. 2, the underside edge of the slit 20 is raised relative to the tongue edge 30, bringing the portion of the underside 16 overlapped by the tongue 18 closer to the tongue 18, which essentially closes the slit 20.

RECAPITULATION

The fastener resists the tendency of prior fasteners with V-notched heads to tip or cant while they are in place in a panel member. It also resists the tendency of resilient panel materials to become disengaged from fasteners with slitted heads. Because the new fastener does resist tipping or canting, the fastener acts with the panels to create a combination more shear resistant than that created by panels with old fasteners.

What I claim is:

1. In a resilient fastener for attaching a complementary panel member to a support member, said panel member and said support member each including an aperture, said fastener comprising: a head of larger diameter than said panel member aperture, said head including an upperside, an underside and a circumferential edge; a shank extending from said underside of said head; said head having a slit extending radially inwardly from said circumferential edge of said head; and a lead-in tongue spaced above and generally parallel to said upperside of said head, said lead-in tongue being connected to said upperside of said head along one side of said slit for the introduction of said head into and through said panel member aperture as said fastener is rotated relative to said panel member aperture, said lead-in tongue circumferentially overlapping and substantially covering said slit for its entire length and overlapping a portion of said upperside of said head.

2. The fastener as described in claim 1, wherein said tongue includes a tip at its radial outer end which extends radially beyond said head to provide a guiding surface for the entry of said head through said panel member aperture.

3. The fastener as described in claim 1, further including a continuous flange which is spaced from said head along said shank and generally parallel to said head, wherein said flange acts so as to resiliently seal off said aperture in said support panel.

4. The fastener as described in claim 2, further including a continuous flange which is spaced from said head along said shank and generally parallel to said head, wherein said flange acts so as to resiliently seal off said aperture in said support panel.

5. The fastener as described in claim 1 or 2 or 4, further comprising a plurality of outwardly extending projections along said shank to ensure attachment of said panel member to said support member.

* * * * *